(12) United States Patent
Heltsch et al.

(10) Patent No.: US 11,446,884 B2
(45) Date of Patent: Sep. 20, 2022

(54) PROCESS FOR PRODUCING A COMPONENT WHICH IS TWO-DIMENSIONAL IN REGIONS FROM A FIBRE COMPOSITE MATERIAL

(71) Applicant: Airbus Operations GmbH, Hamburg (DE)

(72) Inventors: Norbert Heltsch, Hamburg (DE); Paul Jörn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 336 days.

(21) Appl. No.: 16/665,458

(22) Filed: Oct. 28, 2019

(65) Prior Publication Data

US 2020/0130293 A1   Apr. 30, 2020

(30) Foreign Application Priority Data

Oct. 29, 2018   (DE) .......................... 102018126910.2
Nov. 30, 2018   (DE) .......................... 102018009379.5

(51) Int. Cl.
*B64F 5/10*   (2017.01)
*B29L 31/30*   (2006.01)
(Continued)

(52) U.S. Cl.
CPC .............. *B29C 70/22* (2013.01); *B29C 70/42* (2013.01); *B64F 5/10* (2017.01); *B29L 2031/3076* (2013.01)

(58) Field of Classification Search
CPC ......... B29C 70/22; B29C 70/42; B29C 70/16; B29C 70/78; B29C 70/30; B29C 70/08;
(Continued)

(56) References Cited

U.S. PATENT DOCUMENTS

| 2,414,125 A | * | 1/1947 | Rheinfrank, Jr. ..... | B29C 70/865 428/111 |
| 6,692,681 B1 | * | 2/2004 | Lunde ................... | B29C 70/342 264/510 |

(Continued)

FOREIGN PATENT DOCUMENTS

| EP | 1 899 149 B1 | 1/2009 |
| EP | 2 821 340 A1 | 1/2015 |

(Continued)

OTHER PUBLICATIONS

European Office Action for Application No. 1920586181017 dated Jun. 12, 2021.
(Continued)

*Primary Examiner* — Lawrence Averick
(74) *Attorney, Agent, or Firm* — Jenkins, Wilson, Taylor & Hunt, P.A.

(57) ABSTRACT

A process is proposed for producing a component, in which at least one first two-dimensional laid scrim is produced from a fibre composite material having a constant thickness, an outer face and an inner face. At least one second two-dimensional laid scrim is arranged with respect to the first two-dimensional laid scrim and then consolidated. The first two-dimensional laid scrim can be provided in a continuous, efficient production process, which increases speed and lowers costs.

13 Claims, 4 Drawing Sheets

(51) Int. Cl.
  B29C 70/22 (2006.01)
  B29C 70/42 (2006.01)
(58) Field of Classification Search
  CPC .............. B64F 5/10; B29L 2031/3076; B29L 2031/3082; B29D 99/0014
  See application file for complete search history.

(56) References Cited

U.S. PATENT DOCUMENTS

| | | | |
|---|---|---|---|
| 7,135,226 B1 * | 11/2006 | Nagamoto | B29B 15/122 428/365 |
| 7,758,786 B2 * | 7/2010 | Nemchick | B29C 43/146 264/236 |
| 7,780,808 B2 * | 8/2010 | Godbehere | B29C 70/30 156/166 |
| 8,790,777 B2 * | 7/2014 | Kozar | B29C 70/083 428/399 |
| 9,159,083 B1 * | 10/2015 | Johnson | G06Q 30/0255 |
| 10,040,537 B2 * | 8/2018 | Charles | B64C 3/182 |
| 10,246,575 B2 * | 4/2019 | Kuhmann | C08L 71/00 |
| 10,689,114 B2 * | 6/2020 | Huber | B64F 5/10 |
| 2003/0021958 A1 * | 1/2003 | Godbehere | B29C 70/30 428/189 |
| 2009/0057947 A1 * | 3/2009 | Nemchick | B29C 70/46 264/258 |
| 2013/0280516 A1 * | 10/2013 | Kozar | B29C 70/16 428/293.4 |
| 2016/0207607 A1 * | 7/2016 | Charles | B64C 1/12 |
| 2017/0121503 A1 * | 5/2017 | Kuhmann | C08K 5/54 |
| 2018/0111689 A1 * | 4/2018 | Huber | B64F 5/10 |

FOREIGN PATENT DOCUMENTS

| | | |
|---|---|---|
| FR | 3 061 070 A1 | 6/2018 |
| WO | WO 01/58680 A1 | 8/2001 |
| WO | WO 2007/003372 A1 | 1/2007 |
| WO | WO 2009/080735 A2 | 7/2009 |

OTHER PUBLICATIONS

European Search Report for Application No. 19205861.8 dated Mar. 20, 2020.

* cited by examiner

PROCESS FOR PRODUCING A COMPONENT WHICH IS TWO-DIMENSIONAL IN REGIONS FROM A FIBRE COMPOSITE MATERIAL

CROSS-REFERENCE TO PRIORITY APPLICATIONS

This application claims the benefit of, and priority to, German patent application number 102018126910.2, filed on Oct. 29, 2018. This application also claims the benefit of, and priority to, German patent application number 102018009379.5, filed on Nov. 30, 2018.

TECHNICAL FIELD

Embodiments of the subject matter described herein relate generally to a process for producing a component and to such a component.

BACKGROUND

Many different processes have become established for the production of components from fibre-reinforced plastics. Typically, in the production of large-scale components, for example of fuselage shells for commercial aircraft, forming moulds are used, to which a laid fibre scrim is applied and is cured. The laid fibre scrim can be generated by automated devices. In this case, individual fibre webs or fibre mats are made successively, and so individual thickness and fibre profiles are achievable very easily. The laid scrim applied to the forming mould is subjected to a pressure and often to heating, such that the matrix material surrounding the fibres is cured and hence a rigid component is produced.

As well as the use of heat-curable resin as matrix material, there are also known thermoplastic matrix materials. For this purpose, it is possible to use similar processes and operations.

By virtue of the individual fibre and thickness profiles, the generating of laid fibre scrims for production of a large-scale component is very laborious and time-consuming. Furthermore, high demands are placed on automated devices for laying of fibres, which rise with ever-increasing component dimensions. Although production processes for providing components made from fibre composite materials at higher speed are known, these are capable exclusively of providing components with constant thickness.

BRIEF SUMMARY

It is an object of the disclosure to propose a process for producing a large-scale component in which, in spite of locally different component thicknesses, very substantially continuous production processes are usable that can provide components made from a fibre composite material with high speed and quality.

The object is achieved by a process for producing a component according to Claim 1. Advantageous developments and embodiments can be inferred from the dependent claims and the description that follows.

A process is proposed for producing a component, said process comprising the steps of producing at least one first two-dimensional laid scrim from a fibre composite material having a constant thickness, an outer face and an inner face, wherein the first laid scrim has a two-dimensional extent that determines the two-dimensional extent of the component, the producing of at least one second two-dimensional laid scrim from the fibre composite material, where the two-dimensional extent of the at least one second laid scrim is less than that of the at least one first two-dimensional laid scrim, the positioning of the second laid scrim at such regions of the inner face of the first laid scrim where there is a need to increase a local thickness in order to increase local strength, and the consolidating of the composite composed of the first laid scrim and the second laid scrim at least with application of pressure.

The first two-dimensional laid scrim consequently has a single thickness which is constant throughout. At the same time, the first two-dimensional laid scrim also determines the two-dimensional extent of the component to be produced by the process according to the disclosure. The first two-dimensional laid scrim should consequently be regarded as a kind of base that provides a smooth outer skin especially in the case of production of a fuselage shell of an aircraft.

Owing to the simple geometry, the production of such a first two-dimensional laid scrim can be effected by a production process performable in a particularly efficient, rapid and inexpensive manner. One option is, for example, the use of a process based on a twin belt press, in which (resin) impregnation and consolidation are effected in a single step of operation.

Alternatively, the laying of preimpregnated fibre strips can be effected in an automated operation, for example by way of "AFP" ("automated fibre positioning"). It would be possible to join the individual fibre strips that have been provided with resin to one another with the aid of ultrasound, by the action of a laser or by point heating in order to produce a complete composite.

As a further alternative, it would be possible to effect an automated fibre positioning operation ("AFP"). In that case too, it would be possible to join individual, preimpregnated fibres to one another by way of ultrasound.

The component thickness is influenced locally by producing one or more second two-dimensional laid scrims. In this connection, it should be noted that the first laid scrim determines a minimum thickness of the component. A reduction in a component thickness cannot be performed, but rather only an increase in the component thickness by the arrangement of the second laid scrim. The thickness of the first laid scrim consequently corresponds to the lowest local thickness of the component to be produced.

It is possible to employ the same operations for the production of the second laid scrim as for the first laid scrim. However, owing to the possible multitude of variants of the second laid scrim, it is conceivable that a twin belt press is not necessarily preferable. Consequently, it is possible to use more automated laying processes by which very individual, small-scale second laid scrims are producible. Consolidating or curing is not necessarily required. Instead, it is also possible for individual elements therein to be joined to one another by way of ultrasound.

The component is produced by positioning the second laid scrims on those regions of the inner face of the first laid scrim where there is a need to increase the local thickness by comparison with the local minimum thickness, for example owing to anticipated structural and mechanical loads. The individual laid scrims are combined especially using a forming mould that can accommodate these components.

The forming moulds that are useful for this purpose may be implemented in different ways. Firstly conceivable are forming moulds having a mould surface that accommodate the first laid scrim by its outer face. All other components are disposed on a side of the forming mould remote from the mould surface. Other forming moulds, meanwhile, may have a mould surface or the like which, for example, also directly accommodates the reinforcement components mentioned below, onto which the second laid scrims and the first laid scrim are then arranged. This is addressed in more detail with regard to further embodiments below.

Finally, the composite composed of the first laid scrim and the second laid scrims is consolidated at least with application of pressure. This means that the composite is placed between the forming mould and a further device and consolidation is achieved especially by pressing. This is especially accompanied by heating. Both in the case of a thermoplastic matrix material and in the case of a heat-curable resin, this ultimately leads to a consolidated component.

The particular advantage of the disclosed process is that a very large base part can be produced in a separate, very efficient and rapidly performable process, and then more individual, additional second laid scrims used to increase the thickness are producible in a distinctly smaller format and mountable in automated processes. Overall, the process for producing the component is distinctly simplified since there is no need for very large-scale fibre laying apparatuses that are very costly owing to the size of the components to be produced if high precision is required even over large component dimensions. Equally, the disclosed process allows production of even larger-scale components than by processes currently known. It is conceivable that fuselage shells or fuselage half-shells having a length of well over 20 m are producible by such a process. Meanwhile, the design and configuration of such components can be influenced by the disclosed process in that the topology of the fibre structure is matched to a simplification of the production.

It should be pointed out here that the individual laid scrims, i.e. the first laid scrims and/or the second laid scrims, preferably have an intrinsically symmetrical layer structure, such that tensions or deformations are avoided.

In an advantageous embodiment, the at least one first two-dimensional laid scrim has an even number of first two-dimensional laid scrims.

The at least one first laid scrim and the second laid scrims are preferably produced from a fibre-reinforced thermoplastic. The matrix material may consequently be a thermoplastic, for example polyamide, PEKK, PEEK or PPS. One advantage in the case of use of a thermoplastic is the possibility of at least partly melting the matrix material by heating and pressure, such that the individual components of the composite already have a certain dimensional stability prior to the consolidation and subsequently undergo good material-material bonding.

In an advantageous embodiment, the process also comprises the providing of multiple reinforcing elements and the positioning of the reinforcing elements on the inner face of the first laid scrim prior to the consolidating. The providing of the reinforcing elements may comprise the mere providing of purchased reinforcing elements. However, it would likewise be conceivable to produce such reinforcing elements by a process for production of components from a fibre composite material. The aim is to provide suitable reinforcing elements that are arranged with material cohesion on the inner face of the first two-dimensional laid scrim. Subsequently, the composite composed of the first laid scrim, the second laid scrims and the reinforcing elements is consolidated at least with application of pressure.

In a preferred embodiment, the producing of the at least one first laid scrim comprises the producing of an even number of first two-dimensional laid scrims with an outer first laid scrim and an inner first laid scrim, where the positioning of the second laid scrims comprises the introducing of at least a portion of the second laid scrims between the outer first laid scrim and the inner first laid scrim. Both first laid scrims have an inner face and an outer face. The outer face of the inner first laid scrim faces the outer first laid scrim, while the inner face of the outer first laid scrim faces the inner first laid scrim. Consequently, the two first two-dimensional laid scrims form the basis of the component to be produced, with a portion of the second laid scrims enclosed by the two first laid scrims for local reinforcement. The surfaces determined by the two first laid scrims are very continuous and complete, which has a positive effect on the strength of the component. In the consolidating of the composite composed of the components mentioned, it should be noted that trueness to shape, for example of the outer first laid scrim forming, for instance, an outer surface of a fuselage shell, is desired.

The aforementioned reinforcing elements are preferably positioned on the inner face of the inner first laid scrim prior to the consolidating.

Preferably, the inner first laid scrim and the outer first laid scrim have a mutually symmetrical layer structure. More preferably, the inner laid scrims and the outer laid scrims have a mutually symmetrical layer structure. In this way, it is possible to avoid tensions or deformations after an initial consolidation in the component to be produced. More particularly, the two first laid scrims were to have an identical thickness with an identical number of layers and identical materials.

An advantageous embodiment also includes the positioning of one or more of the second or third laid scrims on an inner face of the inner first laid scrim. In this way, it is possible to generate further local reinforcements. Since these are not between two complete first laid scrims, much more significant changes in cross section are possible. For example, 90° transitions or surface slopes with a ratio of 1:20 may be employed where required. Such second laid scrims would lead to deformations, tensions, cavities and hence to delamination under load between two first laid scrims, and so such second laid scrims should be disposed especially on the inner face of an inner first laid scrim. It would be possible to choose the size of such second laid scrims such that automated fibre laying operations can be avoided and twin belt presses in particular are usable.

In a further advantageous embodiment, the second laid scrims disposed on the inner face of the inner first laid scrim are in symmetric form with respect to the second laid scrims disposed between the two first laid scrims. This means that the layers have fibre directions that are symmetrical with respect to one another.

The producing of the at least one first laid scrim can preferably be performed by way of a twin belt press. It is possible in such a press to produce a workpiece in any length. For example, a fibre material may be coated or impregnated with a matrix material and consolidated. The twin belt press has two belts running parallel to one another that exert a desired pressure on a semifinished product running through the apparatus. As set out above, it is possible to produce large components in sheet form from a fibre composite material with a constant thickness. The twin belt press is an option especially in the case of use of a fibre composite material with a thermoplastic matrix material.

The producing of the second laid scrims can be performed at least partly by way of an automated fibre laying process. It is thus also possible to achieve more complex outlines of the second laid scrims. Moreover, it may be an option especially in the case of relatively small dimensions of the second laid scrim to use such processes for more individual configuration.

It would be possible to form the composite in a forming mould, wherein the composite is then enclosed between the forming mould and a contact pressure block, and wherein the composite is consolidated by the action of a mechanical pressure from the contact pressure block in the direction of the forming mould. The contact pressure block may have a certain flexibility, such that the components of the composite are pressed against one another when the composite is pressed onto a solid forming mould. In the case of use of two first laid scrims, there may still be small, hollow voids in the composite that are eliminated in the pressing by adjusting the shape of the inner first laid scrim in particular.

It is conceivable that the shape of an inner first laid scrim is adjusted in three dimensions before the composite is formed in the forming mould. The same applies to the reinforcing components, which could be converted to a desired three-dimensional shape prior to the positioning.

If the process according to the disclosure serves for production of a part of an aircraft fuselage, for example a fuselage shell, the process could also include the embedding of a lightning guard layer. This could be designed as a global layer with a uniform thickness extending across the entire component.

In an advantageous embodiment, the consolidating can be performed by an operation selected from a group of operations comprising press consolidation, vacuum consolidation and autoclave consolidation. Press consolidation has already been mentioned above. Consolidating in an autoclave leads to uniform pressurization of the composite with simultaneous heating. However, it is necessary here to adjust the size of an autoclave into which the composite is inserted. As an alternative, it is also conceivable to cover the composite with a vacuum foil and to evacuate the interspace between the forming mould and the vacuum foil. As a result, the ambient pressure surrounding the forming mould results in contact pressure on the composite. This could be comparatively simple if the ambient pressure is mechanically sufficient.

It is preferable when the first, second and third laid scrims are produced from a fibre-reinforced thermoplastic.

The disclosure further relates to a component including at least one first two-dimensional laid scrim made of a fibre composite material having a constant thickness, an outer face and an inner face, wherein the first laid scrim has a two-dimensional extent that determines the two-dimensional extent of the component, at least one second two-dimensional laid scrim made of the fibre composite material, wherein the two-dimensional extent of the second laid scrim is less than that of the first two-dimensional laid scrim, and wherein the composite composed of the at least one first laid scrim and the at least one second laid scrim is consolidated at least with application of pressure.

The component may also have multiple reinforcing elements disposed on the inner face of the at least one first laid scrim. In that case, the composite composed of the at least one first laid scrim, the second laid scrims and the reinforcing elements is consolidated at least with application of pressure.

In an advantageous embodiment, the component has two first laid scrims and at least a portion of the second laid scrims is disposed between the first laid scrims.

In addition, the component may have an even number of first two-dimensional laid scrims made from a fibre composite material having a constant thickness, an outer face and an inner face, wherein the first laid scrim has a two-dimensional extent that determines the two-dimensional extent of the component, multiple second and third two-dimensional laid scrims made of the fibre composite material, wherein the two-dimensional extents of the second and third laid scrims are less than that of the first two-dimensional laid scrim, and multiple reinforcing elements, wherein the second laid scrims are disposed in such regions of the inner face of the outer first laid scrim and the third laid scrims are disposed in such regions of the inner face of the inner first laid scrim where there is a need to increase a local thickness to increase the local strength, wherein the reinforcing elements are disposed on the inner face of the first laid scrims, and wherein the composite composed of the first laid scrims, the second and third laid scrims and the reinforcing elements is consolidated at least with application of pressure.

Preferably, the component has been produced by one of the aforementioned processes. This component may especially be a fuselage shell, a wing shell, an empennage shell or another two-dimensional component of an aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses will be apparent from the description below of the working examples and the figures. All features described and/or pictured, on their own and in any combination, form the subject-matter of the disclosure, even irrespective of their composition in the individual claims or their dependency references. In the figures, in addition, identical reference numerals represent identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
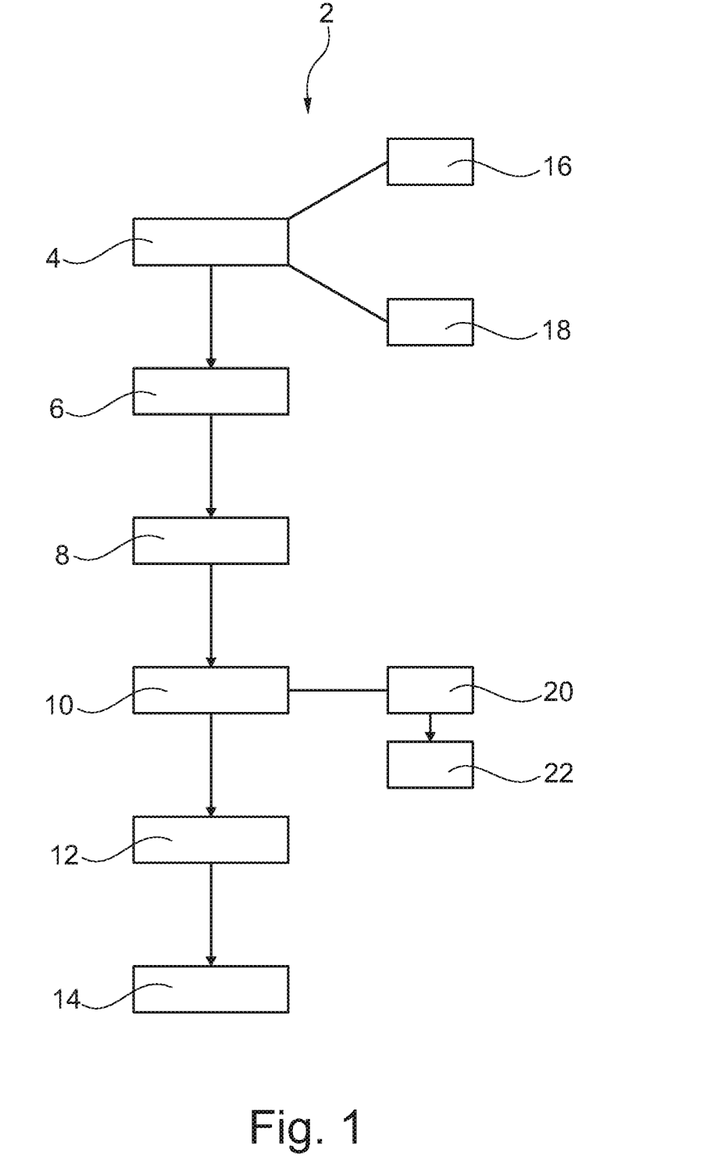
FIG. 1 shows a process in a schematic, block-based diagram.

FIG. 1 shows a process 2 for producing a component in a schematic, block-based diagram. The process 2 begins, by way of example, with the production 4 of at least a first two-dimensional laid scrim from a fibre composite material having a constant thickness, wherein the first laid scrim has a two-dimensional extent that determines the two-dimensional extent of the component. Subsequently, simultaneously or in a preceding step, multiple second two-dimensional laid scrims are produced 6 from the fibre composite material, wherein the two-dimensional extents of the second laid scrim are less than that of the first two-dimensional laid scrim. Subsequently, simultaneously or in a preceding step, multiple reinforcing elements are provided 8.

For the sake of simplicity, these three steps 4, 6 and 8 are identified as successive steps. As stated, however, these can also be implemented in a different sequence.

If these components, i.e. the at least one first two-dimensional laid scrim, the second two-dimensional laid scrims and the reinforcing elements, are present, these are positioned appropriately in order to form a composite of components. The second laid scrims are positioned 10 in those areas of an inner face of the first laid scrim where there is a need to increase a local thickness to increase the local strength.

Subsequently or in a preceding step, reinforcing elements are positioned 12 on the inner face of the first laid scrim, followed by consolidating 14 of the composite composed of the first laid scrim, the second laid scrims and the reinforcing elements at least with application of pressure. Here too, for the sake of simplicity, process steps 10 and 12 are identified as successive steps. However, the sequence in which these steps are conducted may especially depend on the shape of the forming mould.

The producing 4 of the at least one first two-dimensional laid scrim may comprise the producing 16 of an outer first laid scrim and the producing 18 of an inner first laid scrim. The positioning 10 of the second laid scrims may then consequently comprise the introducing 20 of at least a portion of the second laid scrims between the outer first laid scrim and the inner first laid scrim.

In addition, it is also possible to position 22 one or more of the second laid scrims on the inner face of the inner first laid scrim in order to achieve further local reinforcement. These may also be provided with stronger shape transitions than the second laid scrims disposed between the first laid scrims.

Figure 2:
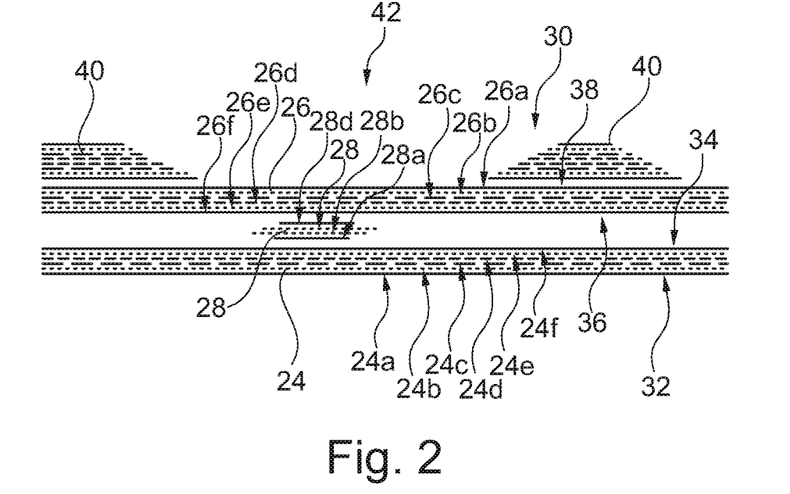
FIG. 2 shows a partial section of a component to be produced.

FIG. 2 shows an illustrative layer structure of a component 42 to be produced in a partial section. What is shown here, at the bottom in the plane of the drawing, is an outer first laid scrim 24 provided with a number of layers 24a, 24b, . . . , 24f. At a distance from this is provided an inner first laid scrim 26 having multiple layers 26a, 26b, . . . , 26f. It is envisaged that the layers 24a to 24f and the layers 26a to 26f are symmetric with respect to one another. This means that the fibre directions of the individual layers are the same as with increasing separation of the first laid scrims 24 and 26 from one another.

Between the two first laid scrims 24 and 26 is disposed a second laid scrim 28 which, by way of example, has a number of layers 28a, 28b, 28c and 28d. It is preferable that surface transitions in the second laid scrim 28 run very harmonically, such that surface slopes of not more than 1:200 are achieved. By pressing on the inner first laid scrim 26 or the outer first laid scrim 24, the second laid scrim 28 is incorporated flush.

In this connection, the side of a composite 30 made from the laid scrims shown should be identified as follows. A side 32 of the outer first laid scrim 24 remote from the inner first laid scrim 26 should be identified as the outer face 32. The opposite side is the inner face 34. A side of the inner first laid scrim 26 facing the outer first laid scrim 24 is an outer face 36, and on an opposite side an inner face 38. On the inner face 38 of the inner first laid scrim 26 is disposed, by way of example, a number of further second laid scrims 40 that cause additional reinforcement of the component. In the case of these non-incorporated second laid scrims 40, greater surface slopes of, for example, up to 1:20 may be achieved.

It is preferable that the second laid scrims 40 on the inner face 38 of the inner first laid scrim 26 are in symmetric form with respect to the second laid scrims 28 between the first laid scrims 24 and 26.

Figure 3:
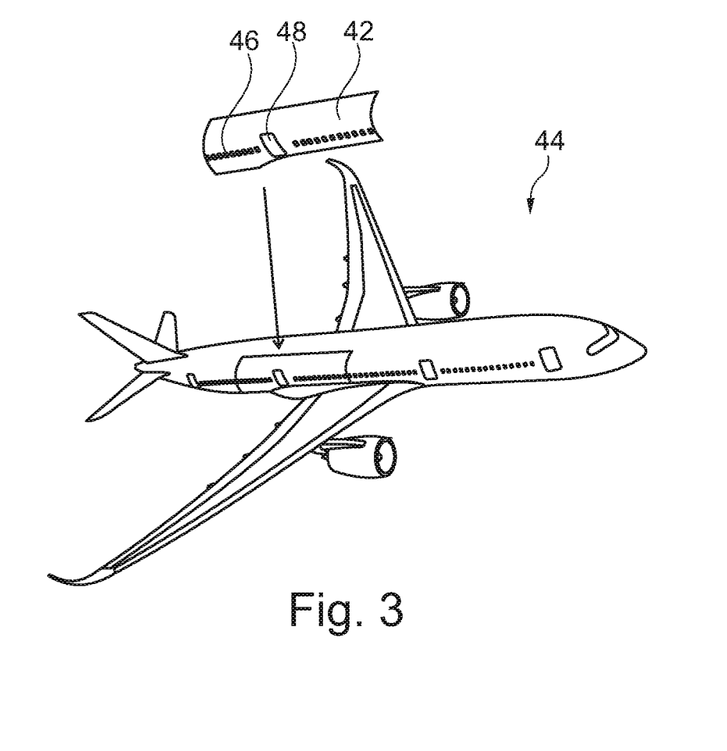
FIG. 3 shows an aircraft and a fuselage shell of the aircraft as the component to be produced.

An example of a component 42 to be produced is the illustration of an aircraft 44 in FIG. 3. The component 42 could be a fuselage shell having multiple window cutouts 46 and a door cutout 48. In regions around the window cutouts 46 and the door cutout 48, there may be areas of local thickening that could be achieved, for example, with second laid scrims 28 and 40. By virtue of the topology shown in FIG. 2, it is possible to achieve areas of local thickening with the aid of second laid scrims 28 and nevertheless to provide large-scale components in efficient and rapid production processes as two-dimensional components with a uniform thickness.

Figure 4:
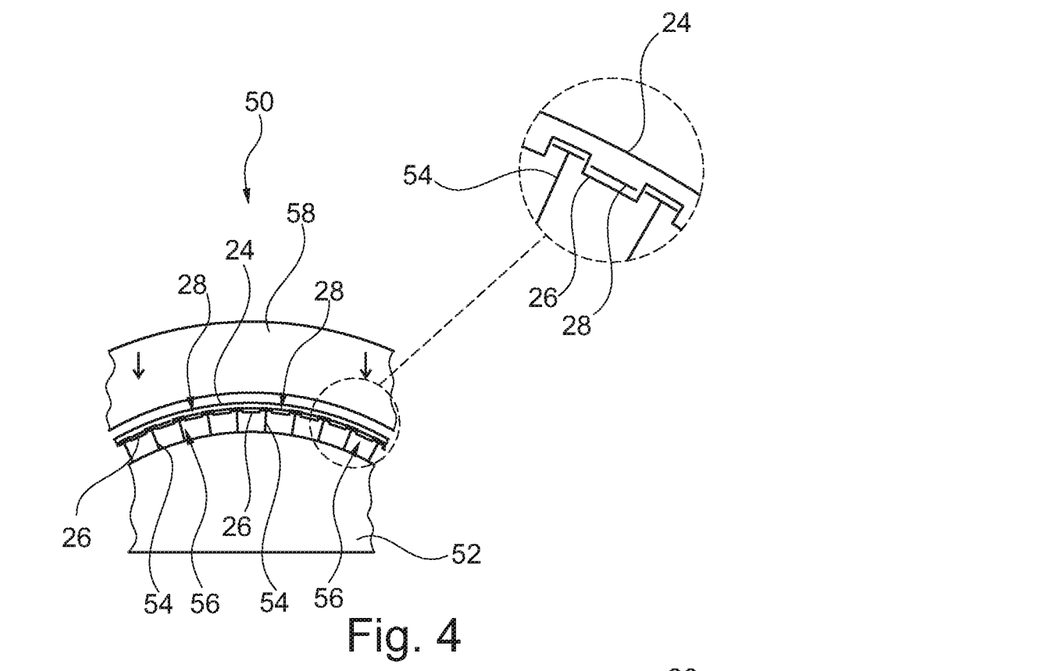
FIGS. 4, 4A, 5 and 5A show the use of different forming moulds.
Figure 4A:
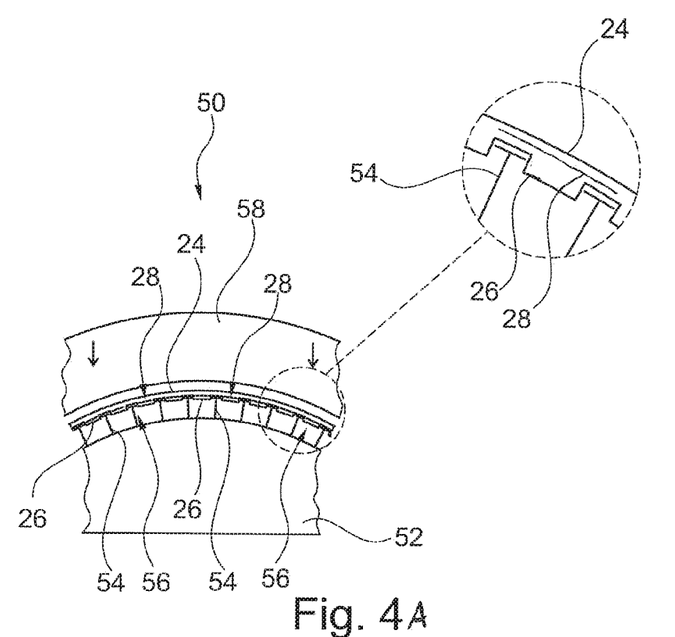

FIGS. 4 and 4A show a first variant of a forming mould 50 having a rigid base 52 on which there are firstly disposed reinforcing elements 54 in the form of stringers. These are directed later toward an inner face of the component 42. The inner first laid scrim 26, the outline of which has been adjusted in three dimensions in some sub-regions 56, is positioned onto the stringers 54. This makes it possible to arrange the incorporated second laid scrims 28 between the stringers 54 or both beneath and between the stringers 54, such that they lead to local thickening.

Subsequently, the outer first laid scrim 24 is arranged. By virtue of the prior adjustment of the outline of the inner first laid scrim 26, the outer face 32 of the outer first laid scrim 24 remains in its planned form. The outer face 32 which constitutes an outer face of the fuselage shell 42, for example, can thus be placed flush onto the other components. By the subsequent pressing-on of the outer first laid scrim 24 by way of a contact pressure block 58, it is possible to perform a consolidation without any change in the shape of the outer first laid scrim 24. The incorporated second laid scrims 28 may likewise have been provided with a final three-dimensional outline or they are placed on in largely flat form and only converted to their envisaged form by the pressing-on of the contact pressure block 58.

The diagrams in FIGS. 4 and 4A should merely be understood by way of example; further laid scrims are also possible and, in addition, it would also be possible to integrate a lightning guard layer (not shown). In addition, rather than a contact pressure block 58, it would also be possible to apply a vacuum foil such that air is sucked out between the vacuum foil and the rigid base 52, such that the air pressure surrounding the forming mould 50 acts on the composite 30.

Figure 5:
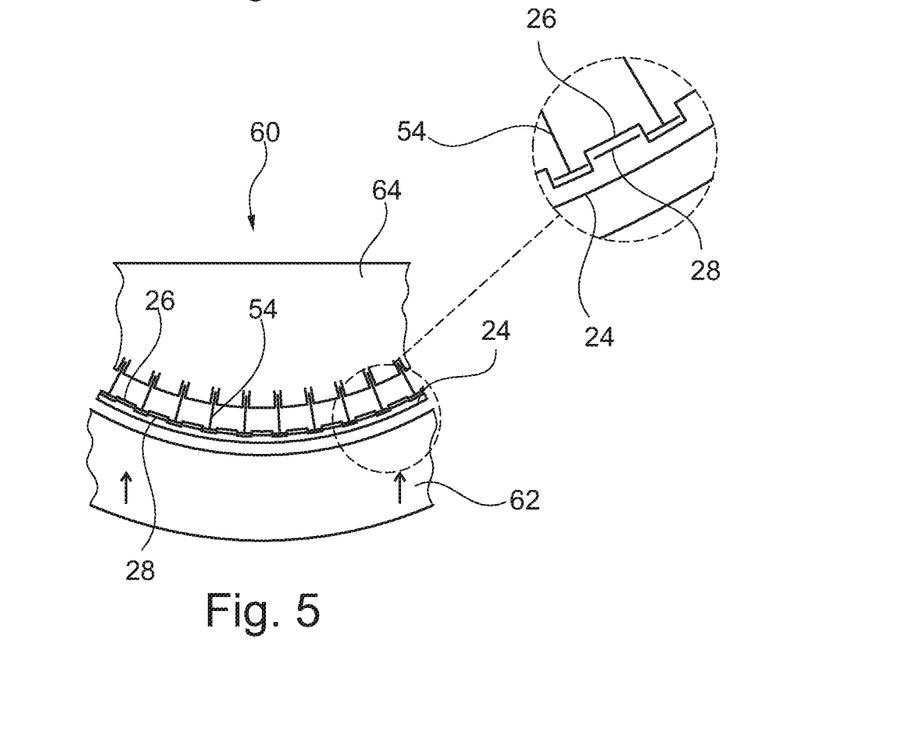
Figure 5A:
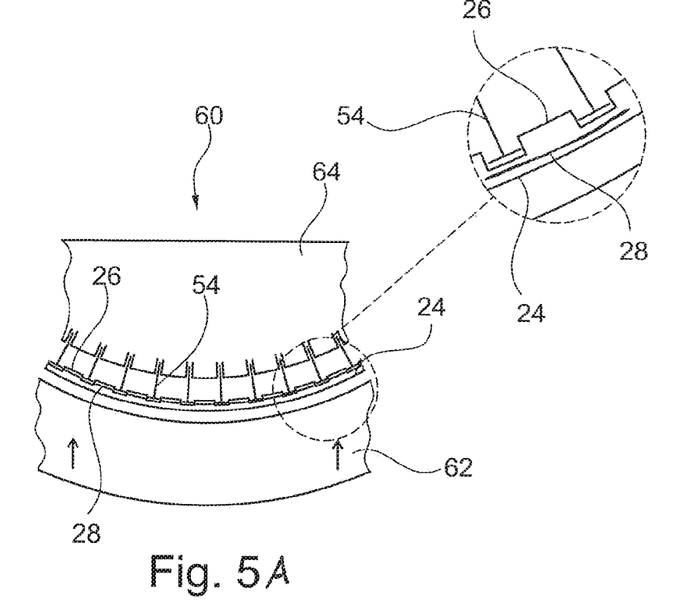

FIGS. 5 and 5A show a different forming mould 60. This has a rigid base 62 on which the outer face 32 of the outer first laid scrim 24 is positioned. This is followed by the incorporated second laid scrims 28, on which the inner first laid scrim 26 is positioned. Subsequently, the reinforcing components 54 are mounted. A contact pressure block 64 then serves to press on the reinforcing elements 54 and the inner first laid scrim 26, especially with simultaneous heating for consolidation of the component.

It should additionally be pointed out that "including" does not exclude any other elements or steps, and "a" or "an" does not exclude a multitude. Moreover, it should be pointed out that features that have been described with reference to one of the above working examples can also be used in combination with other features of other working examples

REFERENCE NUMERALS 2 process
4 producing a first two-dimensional laid scrim
6 producing second two-dimensional laid scrims
8 providing reinforcing elements
10 positioning second laid scrims
12 positioning reinforcing elements
14 consolidating
16 producing of outer first laid scrim
18 producing of inner first laid scrim
20 introducing of second laid scrims between first laid scrim
22 positioning of second laid scrims
24 outer first laid scrim
26 inner first laid scrim
28 (incorporated) second laid scrim
30 composite
32 outer face of the outer first laid scrim
34 inner face of the outer first laid scrim
36 outer face of the inner first laid scrim
38 inner face of the inner first laid scrim
40 second laid scrim
42 component
44 aircraft
46 window cutout
48 door cutout
50 forming mould
52 rigid base
54 reinforcing elements
56 sub-regions of the inner first laid scrim
58 contact pressure block
60 forming mould
62 rigid base
64 contact pressure block While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A process for producing a component, comprising:
producing an even number of first two-dimensional laid scrims from a fibre composite material having a constant thickness, an outer face, and an inner face, where each of the first laid scrims has a two-dimensional extent that determines the two-dimensional extent of the component, and wherein the even number of first laid scrims comprises an outer first laid scrim and an inner first laid scrim;
producing at least one second two-dimensional laid scrim from the fibre composite material, where the two-dimensional extent of the second laid scrim is less than that of the first two-dimensional laid scrims;
selectively positioning at least a portion of the at least one second laid scrim at discrete regions of the inner face of the outer first laid scrim to increase a local thickness in order to increase local strength; and
positioning the inner first laid scrim such that the portion of the at least one second laid scrim is arranged between the outer first laid scrim and the inner first laid scrim, and
consolidating the composite composed of the inner first laid scrim, the outer first laid scrim, and the second laid scrim at least under application of pressure.

2. The process according to claim 1, further comprising:
providing multiple reinforcement elements; and
positioning the reinforcement elements on the inner face of the first laid scrim prior to the consolidating.

3. The process according to claim 1, wherein the inner first laid scrim and the outer first laid scrim have a mutually symmetrical layer structure.

4. The process according to claim 1, further comprising positioning of one or more of the second laid scrims or third laid scrims on an inner face of the inner first laid scrim.

5. The process according to claim 4, wherein the second laid scrim disposed on the inner face of the inner first laid scrim are in symmetric form with respect to the second laid scrims disposed between the two first laid scrims.

6. The process according to claim 1, wherein the producing of the at least one first laid scrim is performed by a twin belt press.

7. The process according to claim 1, wherein:
the composite is formed in a forming mould;
the composite is then enclosed between the forming mould and a contact pressure block; and
the composite is consolidated by action of a mechanical pressure from the contact pressure block in the direction of the forming mould.

8. The process according to claim 1, wherein a shape of the inner first laid scrim is adjusted in three dimensions before the composite is formed in a forming mould.

9. The process according to claim 1, wherein the consolidating is conducted by press consolidation.

10. The process according to claim 1, wherein the component is a fuselage shell, a wing shell, an empennage shell or another two-dimensional component of an aircraft.

11. A component comprising:
an even number of first two-dimensional laid scrims comprising a fibre composite material having a constant thickness, an outer face, and an inner face, where each of the first laid scrims has a two-dimensional extent that determines the two-dimensional extent of the component, and wherein the even number of first laid scrims comprises an outer first laid scrim and an inner first laid scrim; and
at least one second two-dimensional laid scrim composed of the fibre composite material, wherein the two-dimensional extent of the second laid scrim is less than that of the first two-dimensional laid scrims;
wherein at least a portion of the second laid scrims are disposed at discrete regions of the inner face of the outer first laid scrim to increase a local thickness in order to increase local strength;
wherein the inner first laid scrim is positioned such that the portion of the at least one second laid scrim is arranged between the outer first laid scrim and the inner first laid scrim; and wherein the composite composed of the inner first laid scrim, the outer first laid scrim, and the second laid scrim has been consolidated at least with application of pressure.

12. The component according to claim 11, wherein the composite is consolidated without any change in a shape of the outer first laid scrim.

13. The process according to claim 1, wherein consolidating the composite composed of the inner first laid scrim, the outer first laid scrim, and the second laid scrim is performed without any change in a shape of the outer first laid scrim.

\* \* \* \* \*